United States Patent
Wells

[11] Patent Number: 6,056,010
[45] Date of Patent: May 2, 2000

[54] ANTI-CHECK LOW SPILL FLUID COUPLING

[75] Inventor: Michael P. Wells, Holland, Ohio

[73] Assignee: Aeroquip Corporation, Maumee, Ohio

[21] Appl. No.: 09/121,453

[22] Filed: Jul. 23, 1998

[51] Int. Cl.⁷ .................................................. F16L 37/28
[52] U.S. Cl. ............................. 137/614.06; 137/614.05; 137/614
[58] Field of Search ..................... 137/614.06, 614.05, 137/614

[56] References Cited

U.S. PATENT DOCUMENTS

| | | | |
|---|---|---|---|
| 2,319,015 | 5/1943 | Speth | 137/614.03 |
| 2,966,371 | 12/1960 | Brunning | 137/614.04 |
| 3,336,944 | 8/1967 | Anderson et al. | 137/614.04 |
| 3,680,591 | 8/1972 | Vik | 137/614.05 |
| 4,009,729 | 3/1977 | Vik | 137/614.06 |
| 4,098,292 | 7/1978 | Evans | 137/614.04 |
| 4,213,482 | 7/1980 | Gondek | 137/614.06 |
| 4,543,993 | 10/1985 | Cahin et al. | 137/614.01 |
| 4,614,348 | 9/1986 | Fournier | 277/188 |
| 4,664,148 | 5/1987 | Magnuson | 137/614.06 |
| 4,892,117 | 1/1990 | Spalink et al. | 137/614 |
| 5,123,446 | 6/1992 | Haunhorst et al. | 137/614 |
| 5,129,423 | 7/1992 | Fournier et al. | 137/614 |
| 5,179,976 | 1/1993 | Boland et al. | 137/614 |
| 5,215,122 | 6/1993 | Rogers et al. | 137/614 |
| 5,226,682 | 7/1993 | Marrison et al. | 285/308 |
| 5,452,736 | 9/1995 | Arasio | 137/614.03 |
| 5,709,243 | 1/1998 | Wells et al. | 137/614.03 |

FOREIGN PATENT DOCUMENTS

| | | |
|---|---|---|
| 3406211 | 8/1985 | Germany . |
| 4114465 A1 | 11/1991 | Germany . |
| 4114480 A1 | 11/1991 | Germany . |

OTHER PUBLICATIONS

Hydraulic Fluid Power –Quick–Action Couplings, International Standard, published Apr. 1, 1987.

Quick Disconnect Couplings, Aeroquip Bulletin JB27, published 1992.

Primary Examiner—Denise L. Ferensic
Assistant Examiner—Joanne Y. Kim
Attorney, Agent, or Firm—Emch, Schaffer, Schaub & Porcello, Co., L.P.A.

[57] ABSTRACT

A low spill anti-check fluid coupling for pressurized fluid systems is disclosed. The coupling includes a female part and a male part. The female part has a body member and a sleeve mounted for axial movement within said body member. A spring biased female valve is positioned within the body member. A handle mounted for rotation on said body member is operatively connected to the sleeve for opening said female valve to initiate fluid flow through the coupling. An anti-check spring is operatively connected to the female valve for retaining said female valve is an open position when the fluid coupling is in an open fluid flow condition.

12 Claims, 5 Drawing Sheets

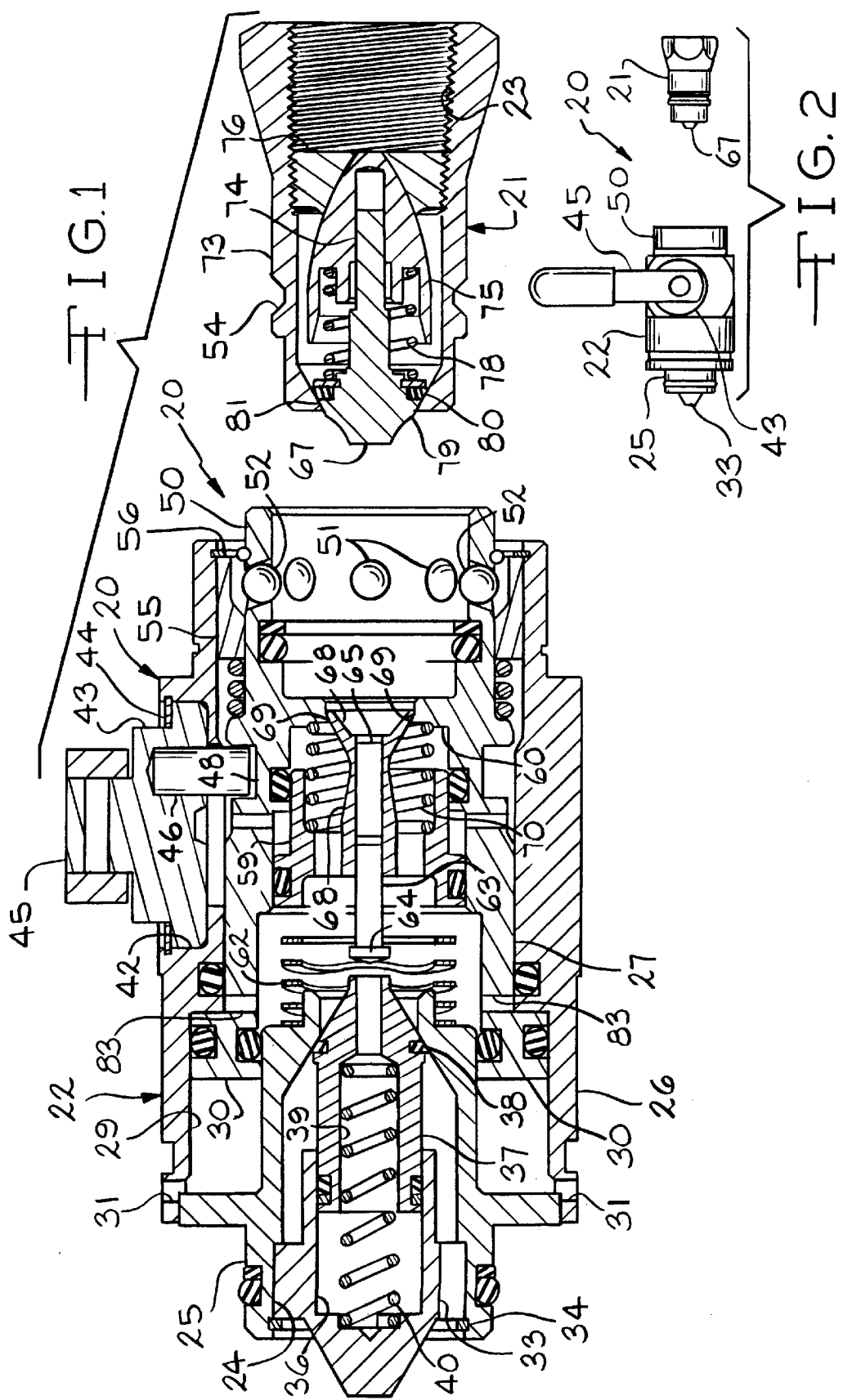

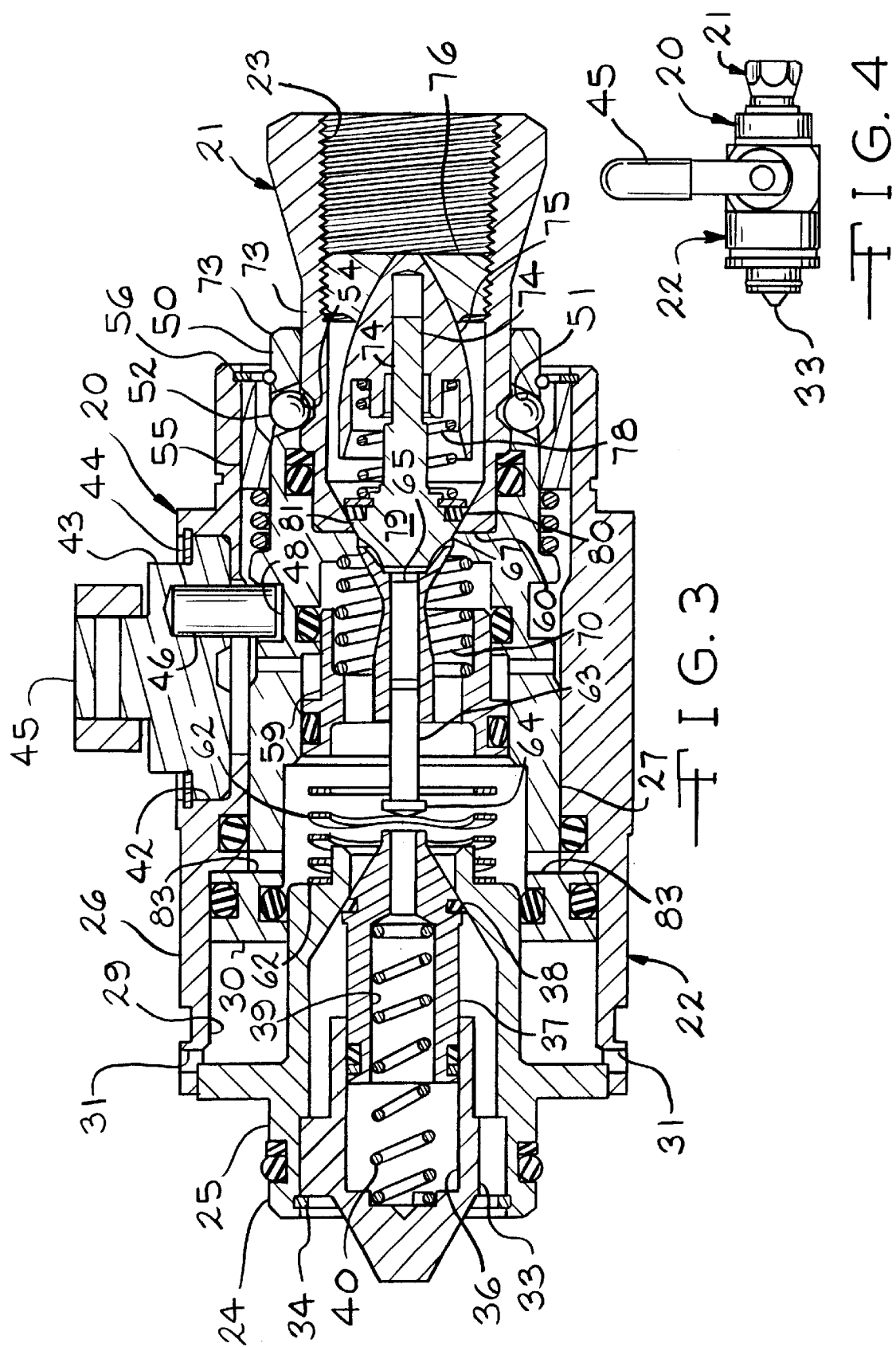

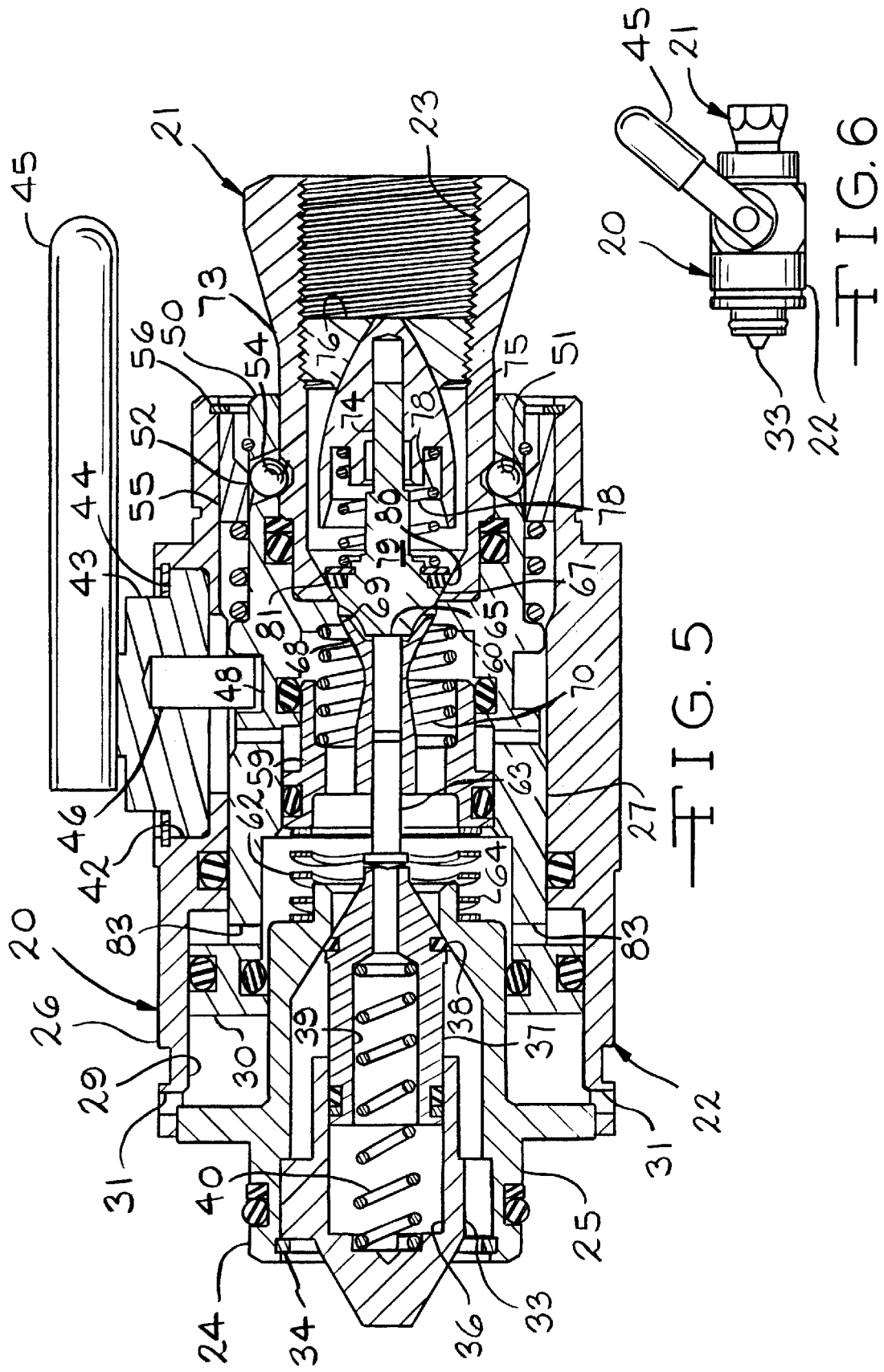

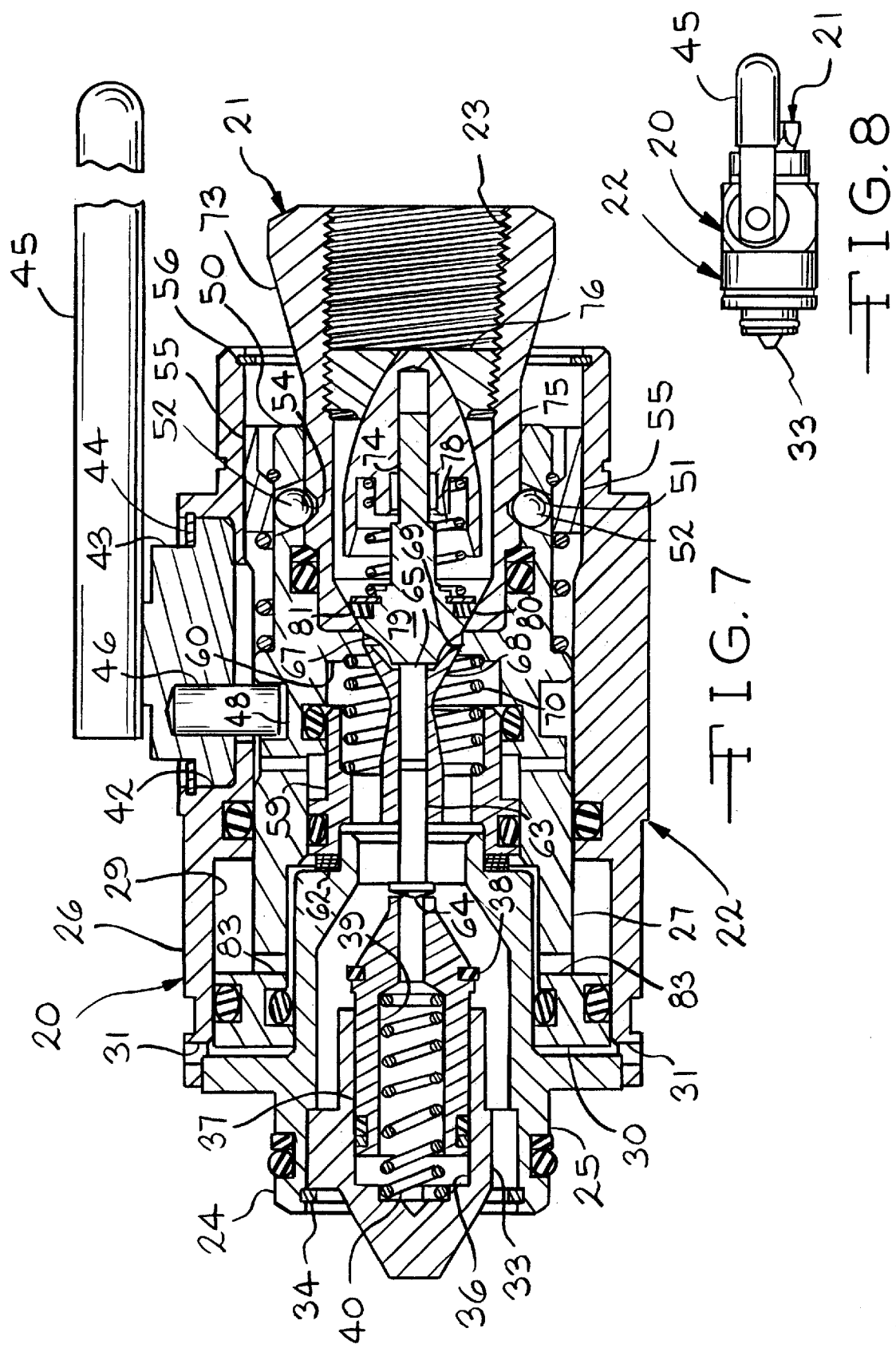

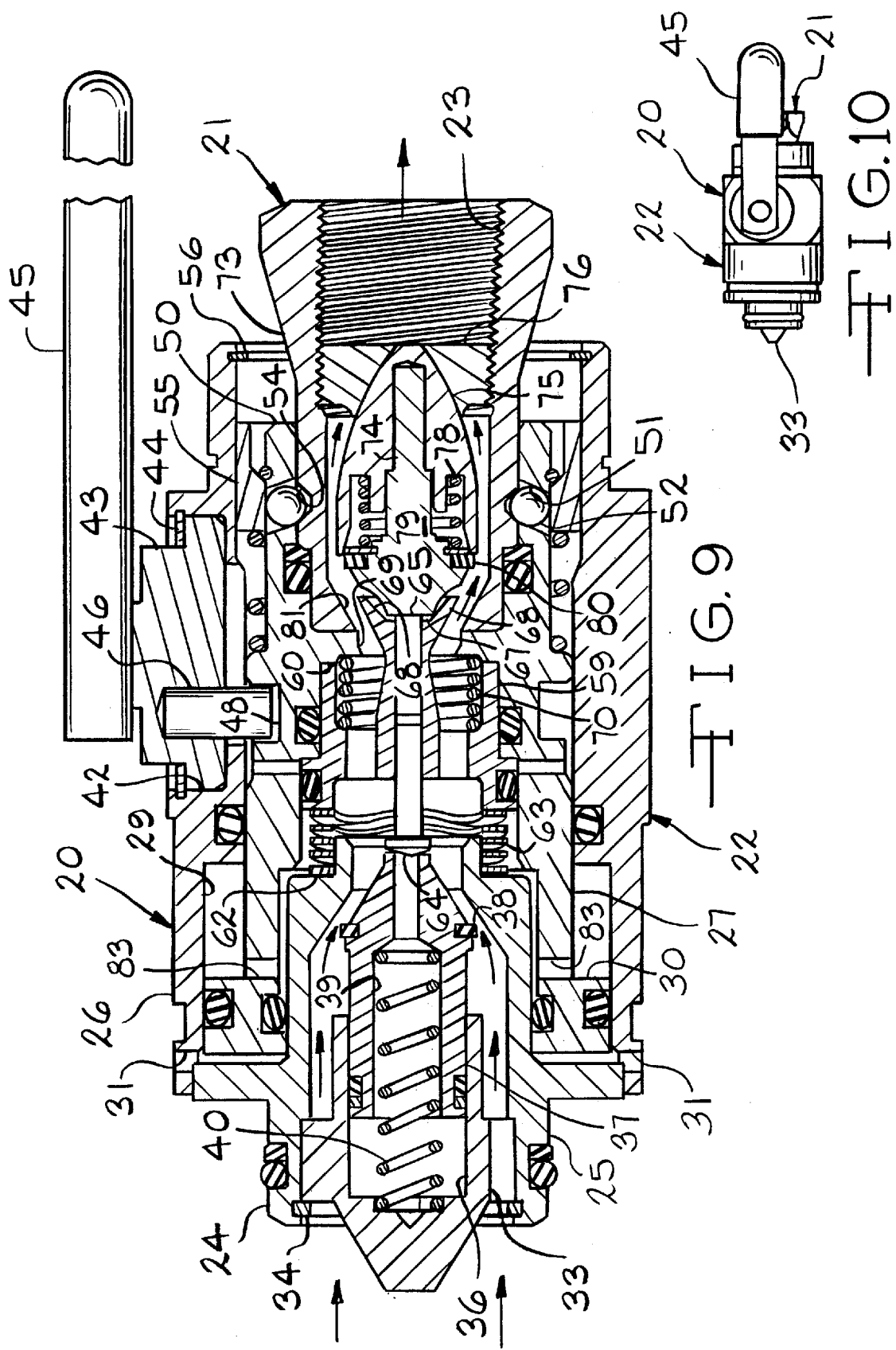

ANTI-CHECK LOW SPILL FLUID COUPLING

BACKGROUND OF THE INVENTION

The present invention is directed to a fluid coupling and more particularly to a fluid coupling in which the coupling parts include self sealing, low spill valves for use in pressurized hydraulic systems.

The present invention is an improvement over the type of valve for use in a pressurized hydraulic system disclosed in U.S. Pat. No. 4,540,021.

Couplings with self sealing valves are commonly utilized in fluid circuits to prevent the escape of fluid when the parts are uncoupled. In many applications it is desirable to utilize quick disconnect couplings comprising a male part attached to one end of a fluid conduit and a female coupling member attached to an end of an opposing conduit, such that the opposing male and female parts may be readily disconnected with a short axial movement of the male part from the female part. Typically, the coupling parts are held together by detent balls which are moved radially inwardly such that they engage and retain the male part positioned in the female part.

It is preferable that the spill of the fluid, such as hydraulic fluid be kept as low as possible. An example of a prior art low spill coupling is disclosed in U.S. Pat. No. 5,709,243.

The anti-check fluid coupling according to the present invention, may be used in any number of pressurized systems. Often, the system is a recirculating system and includes at least two of the fluid couplings, according to the present invention.

Fluid couplings are often used with agricultural equipment where the couplings must be readily coupled and uncoupled. In addition, they must be self-sealing and of the "break away" type where the coupling parts automatically separate when the axial tension in the hose line reaches a predetermined force.

One problem, which is known in the art, is that high pressures sometimes exist within the hydraulic circuit. For example, in an agricultural implement hydraulic circuit where the normal operating pressure is 2500 to 3000 psi, it is not unusual for the pressure to reach 5000 psi due to thermal expansion of the system fluid. During a high pressure condition within the implement circuit, the innerlocking of the coupling parts has often been difficult in prior art couplings.

Another problem arises during operation of a high pressure system. It is not unusual for the pressure within the valved coupling to be affected by operational conditions and vibration conditions such that the valves are inadvertently closed. This is normally referred to as checking and is a well known problem in the fluid coupling art.

The object of the present invention is to provide an improved fluid coupling for use in pressurized fluid systems. More specifically, the improved fluid coupling is a low spill coupling which minimizes any fluid discharge from the coupling parts during disengagement.

A further specific object of the present invention is to provide an anti-check fluid coupling to prevent the undesired closing of coupling valves during operation.

SUMMARY OF THE INVENTION

The present invention is directed to a low spill anti-check fluid coupling for fluid systems. The anti-check fluid coupling includes a female part and a male part which are connected together and disconnected in a normal manner.

The female part includes an annular body member having an axially moveable sleeve mounted within a central opening provided within the body member. A valve assembly is positioned within the body member. The valve assembly includes a valve which is moveable between an open position and a closed position, together with a first spring urging the valve toward the closed position. A stem assembly is mounted within the sleeve. The stem assembly includes a guide mounted by the sleeve together with a stem having first and second ends. A second spring is mounted between the sleeve and stem assembly. The sleeve defines an outlet opening. The stem assembly includes a stem valve adjacent the outlet opening. The second spring urges the stem valve toward a closed position.

An anti-checking spring is mounted adjacent the stem assembly for urging the stem assembly toward the male part whereby flow is maintained through the fluid coupling during operation.

The male part includes an outer generally cylindrical wall member. A stem valve is mounted within the wall member and is moveable between an open position and a closed position. A spring is mounted within the wall member for urging the stem valve of the male part toward the closed position.

A handle is mounted adjacent the annular body member of the female part, whereby rotation of the handle assembly moves the sleeve axially to open the valves, whereby fluid flow occurs through said fluid coupling.

BRIEF DESCRIPTION OF THE DRAWINGS

FIG. 1 is a sectional view of a low spill anti-check fluid coupling, according to the present invention, in its disengaged position with the male and female parts separated from one another;

FIG. 2 is an elevational view of the anti-check fluid coupling in its disengaged position, but shown on a reduced scale;

FIG. 3 is a sectional view similar to FIG. 1, showing the low spill anti-check fluid coupling in a connected posture with the coupling in a closed position;

FIG. 4 is an elevational view similar to FIG. 3 on a reduced scale;

FIG. 5 is a sectional view similar to FIG. 3, showing the handle rotated toward the coupling open position, with no flow through the valve;

FIG. 6 is an elevational view similar to FIG. 5 on a reduced scale;

FIG. 7 is a sectional view of the low spill anti-check fluid coupling with the handle turned to full open position, immediately before fluid flow;

FIG. 8 is an elevational view similar to FIG. 7 on a reduced scale;

FIG. 9 is a sectional view of the low spill anti-check fluid coupling in the fully open position with fluid flow through the coupling; and FIG. 10 is an elevational view similar to FIG. 9 on a reduced scale.

DESCRIPTION OF THE PREFERRED EMBODIMENT

A low spill anti-check fluid coupling, according to the present invention is generally indicated in the drawings by the reference number 20. The anti-checking fluid coupling 20 is a high pressure fluid coupling which can be used in a hydraulic system such as the pressurized supply circuit of a farm implement. The fluid coupling 20 includes a male part 21 and a female part 22. In the present embodiment, the male part 21 includes internal threads 23 which are connected to the implement, such as to a flexible hose of a farm implement. Similarly, the female part 22 includes a connector portion 24 defined by an adapter 25.

The female part 22 includes a generally annular body member 26 which receives an axially moveable sleeve 27 and the adapter 25. In the present embodiment, the inner wall of the body member 26 and the outer wall of the adapter 25 define a chamber 29 which receives a ring shaped piston 30 formed on one end of the sleeve 27. Openings 31 in the body member 26 place the chamber 29 in communication with atmosphere.

A guide member 33 is retained within the adapter 25 by a retaining ring 34. The guide member 33 defines an opening 36 which receives a poppet valve 37 having a valve surface 38. The poppet valve 37 defines a center opening 39. The guide member opening 36 and the aligned center opening 39 of the poppet valve 37 receive a coil spring 40 which biases the poppet valve 37 and its valve surface 38 toward the closed position, against the adapter 25, as shown in FIG. 1.

The annular body member 26 defines a circular opening 42 adjacent its upper end. The circular opening 42 receives a stepped shaft 43 which is held by a retaining ring 44. A handle 45 is mounted on the upper end of the step shaft 43. An eccentric pin 46 is mounted by the step shaft 43 and extends downwardly into a slot 48 defined by the outer surface of the sleeve 27.

Referring to FIGS. 1, 2, 7 and 8, a 90° rotation of the handle 45 axially moves the sleeve 27. The piston 30 also moves within the chamber 29.

Referring to FIG. 1, an end 50 of the sleeve 27 defines a plurality of circumferentially spaced openings 51 which mount balls 52. The male part 21 includes a locking recess 54 on its outer surface. When the male part 21 is inserted into the female part 22, the balls 52 are received in the locking recess 54 and are held in place by a spring biased locking ring 55, as shown in FIG. 7. Undesired axial movement of the locking ring 55 is prevented by a retaining ring 56 mounted in the annular body member 26.

A stem assembly 59 is mounted within the sleeve 27. The stem assembly 59 is prevented from axial movement in one direction by a circular shoulder 60 defined by the sleeve 27. While the stem assembly 59 is prevented from movement in one direction, it has axial movement in the other direction. An important feature of the present invention is a anti-check spring 62 which surrounds a stem 63 of the stem assembly 59. The anti-check spring 62 is preferably a helical spring or a wave spring, which prevents inadvertent valve closure during no-pressure periods of operation and during vibration exposure. Checking is found in many prior art couplings which are subject to different internal pressure conditions. The anti-check spring 62 urges the valve 68 open.

The stem 63 includes a first end 64 engageable with the spring bias poppet valve 37 and a second end 65 which is engageable with a poppet valve 67 positioned within the male part 21. The valve 68 has a generally conical outer valve surface which mates with a valve seat 69 defined by the circular shoulder 60 of the sleeve 27 (see FIG. 9). A coil spring 70 surrounds the stem 63 and extends between the shoulder 60 and the stem assembly 59. The coil spring 70 urges the valve 68 toward the valve seat 69, therefore limiting any spill of fluid upon disconnection of the male part 21 and the female part 22.

The male part 21 includes an outer generally cylindrical wall member 73 which defines the locking recess 54 on its outer surface and the threads 23 on its interior. The stem valve or poppet valve 67 is mounted within the wall member 73. The poppet valve 67 includes a stem 74 which extends rearwardly and is received by a poppet guide 75. the poppet guide 75 is mounted by a threaded insert 76, which is threadably connected to the threads 23 of the wall member 73. A spring 78 surrounds the stem 74 and extends between a head 79 of the poppet valve 67 and the poppet guide 75. The poppet valve 67 includes a valve surface 80 on the head 79 which mates with a valve seat 81 defined on the interior of the wall member 73. The spring 78 urges the valve surface 80 against the valve seat 81 to minimize the loss of any fluid when the male part 21 and the female part 22 of the anti-checking valve coupling 20 are disengaged.

FIGS. 1–10 of the drawings, illustrate the anti-checking fluid coupling 20 during a typical cycle of use. FIGS. 1 and 2 illustrate the anti-checking fluid coupling 20 when the male part 21 and female part 22 are completely disengaged. When in this position, the spring 40 in the female part 22 holds the poppet valve 37 in its closed position. The spring 70 within the female part 22 holds the valve head 68 against the valve seat 69. The spring 78 within the male part 21 urges the poppet valve 67 toward its closed position. To couple the valve, the male part 21 is received by the female part 22, as illustrated in FIGS. 3 and 4. At this time, the balls 52 carried by the sleeve 27 of the female part 22 are received in the locking recess 54 defined by the wall member 73 of the male part 21.

Referring to FIGS. 5 and 6, as the handle is partially rotated, the spring biased locking ring 55 is moved into a locked position with respect to the balls 52, thereby securing the male part 21 and the female part 22 together. In the FIGS. 5 and 6 position, the coupling remains in a neutral position with no flow. The stem 63 of the stem assembly 59 is now in a touching relationship with the poppet valve 37 and the poppet valve or stem valve 67.

FIGS. 7 and 8 illustrate the low spill anti-checking fluid coupling 20 as the handle 45 is moved to the open position, as illustrated in FIG. 8. FIG. 7 illustrates the components as the stem 63 opens the poppet valve 37, disengaging the valve surface 38 from its seat. Because of the pressures which sometimes result from the elevated temperature of farm implements in the male part 21, it is sometimes difficult to manually rotate the handle 45. Accordingly, fluid received through the inlet of the adapter 25 of the female part 22 is directed through openings 83 defined by the sleeve 27. The openings 83 are in communication with the chamber 29. Fluid passing through the openings 83 drive the piston 30 and the sleeve 27 to the rear, thereby aiding the operator in the opening of the coupling.

FIGS. 9 and 10 illustrate the low spill anti-checking fluid coupling 20 in a full open position with flow through the coupling. The second end 65 of the stem 63 has engaged the poppet valve 67 of the male part 21 and moved it to an open position. The valve 68 of the stem assembly 59 has been moved away from the valve seat 69. In this posture, fluid is free to pass through the anti-checking fluid coupling as illustrated by the arrows in FIG. 9. The anti-check spring 62 is in its operating position to prevent inadvertent valve closure during no pressure periods of operation and during exposure to vibration.

Many revisions may be made to the above-described preferred embodiment of the anti-checking fluid coupling, without departing from the scope of the invention or from the following claims.

I claim:

1. A low spill anti-check fluid coupling for pressurized fluid systems, comprising a female part and a male part, said female part including an annular body member, an axially movable sleeve mounted within said annular body member, a female valve assembly positioned within said annular body member, said female valve assembly including a female valve movable between an open position and a closed position, a first spring urging said female valve toward the closed position, a stem assembly mounted within said sleeve, said stem assembly including a stem guide mounted by said sleeve and a stem having first and second ends, a second spring mounted between said sleeve and said stem assembly, a stem valve adjacent said outlet opening, said second spring urging said stem valve toward a closed position, an anti-checking spring mounted adjacent said stem assembly for urging said stem assembly toward said male part whereby flow is maintained through said fluid coupling when said coupling is in the open position, all fluid flowing into said female part flowing to said male part, an adapter mounted adjacent one end of said body member on the opposite side of said sleeve from said male part, said annular body member and said adapter defining an annular chamber, said axially movable sleeve including a cylindrical portion and an enlarged ring-shaped piston extending outwardly from said cylindrical portion positioned within said chamber, an aperture in said cylindrical portion whereby fluid can be directed through said aperture into said chamber to apply pressure to said piston to aid movement of said sleeve, and a seal associated with said piston maintaining a portion of said chamber isolated from the flow of fluid, said male part including an outer generally cylindrical wall member, a male valve mounted within said wall member, said male valve being movable between an open position and a closed position, a third spring mounted within said wall member for urging said male valve toward the closed position and a handle mounted adjacent said annular body member, an axially movable drive member operatively connected between said handle and said sleeve wherein rotation of said handle axially moves said drive member, said drive member transmitting said axial movement to said sleeve upon rotation of said handle to open said valves whereby fluid flow occurs through said fluid coupling.

2. A low spill anti-check fluid coupling according to claim 1, wherein said female valve assembly defines an axial opening, a guide member positioned within said adapter, said guide member defining a guide opening aligned with said axial opening, said first spring being positioned within said axial opening and said guide opening for urging said female valve toward the closed position.

3. A low spill anti-check fluid coupling, according to claim 2 wherein said female valve comprises a poppet valve.

4. A low spill anti-check fluid coupling, according to claim 1, wherein said stem valve has a head with a generally conically shaped outer surface, said outlet opening having a complementary shaped seating surface for engaging said conically shaped outer surface.

5. A low spill anti-check fluid coupling, according to claim 1, wherein said drive member comprises a pin operatively connected to said handle.

6. A low spill anti-check fluid coupling, according to claim 1, wherein said sleeve defines a plurality of circumferentially spaced openings, a ball positioned in each of said openings, said wall member of said male part defining an annular locking recess, said balls being positioned in said locking recess when said male part and said female part are engaged and a spring biased locking ring mounted on said sleeve adjacent said openings, whereby said locking ring urges said balls into said locking recess when said male part and said female part are engaged.

7. A low spill anti-check fluid coupling, according to claim 1, wherein said male valve defines a generally conically shaped outer surface and said wall member defines a mating generally conical valve seat adjacent said conically shaped outer surface of said male valve.

8. A low spill anti-check fluid coupling, according to claim 7, including a guide member mounted within said wall member, said guide member defining a stem opening, said male valve including a stem mounted for movement within said stem opening, said third spring engaging said guide member and at least partially surrounding said stem.

9. A low spill anti-check fluid coupling, according to claim 1, further including a vent between said chamber and atmosphere.

10. A low spill anti-check fluid coupling for pressurized fluid systems, comprising a female part and a male part, said female part including a body member, an axially movable sleeve mounted with said body member, a spring biased female valve positioned within said annular body member, a handle mounted for rotation adjacent said body member and operatively connected to said sleeve for opening said female valve, an annular chamber defined adjacent said body member, said sleeve including a cylindrical portion, an enlarged annular piston position within said annular chamber, an aperture extending through said cylindrical portion whereby fluid can be directed into said chamber to apply pressure to said piston to aid movement of said sleeve when said handle is rotated to begin fluid flow through said coupling, a seal associated with said piston maintaining a portion of said chamber isolated from the flow of fluid, and an anti-check spring adjacent said female valve member for retaining said female valve in an open position when the anti-check fluid coupling is in an open fluid flowing condition.

11. A fluid coupling for use with a male member having a body extending along an axis to an inlet end defining an orifice leading to a passageway, a poppet valve positioned in said passageway movable axially from a first position closing said orifice to a second position opening said orifice, said fluid coupling comprising:

(a) a body member extending along an axis from an inlet end to an outlet end, said body member having
  (i) a first wall section with a radial opening and an inwardly facing cylindrical wall surface, and
  (ii) a second wall section with a larger inwardly facing cylindrical wall surface,
(b) an adapter secured to said body member in the area of said inlet, said adapter having an outwardly facing wall section cooperating with said body member second wall section to define a chamber;
(c) a sleeve axially slideable in said body member from a first position spaced from said inlet end to a second position further away from said inlet end, said sleeve having, (i) an outwardly facing surface slideably engaged to said body member first wall section,
(ii) an enlarged head defining a piston slideably movable in said chamber, and
(iii) an opening between said outwardly facing surface and said enlarged head;
(d) a seal associated with said enlarged head maintaining a portion of said chamber remote from the flow of fluid;
(e) a guide member positioned within said adapter;
(f) a poppet valve slideably positioned within said guide member and axially movable relative to said adapter from a closed position to an open position;
(g) a first spring biasing said poppet valve toward said closed position;
(h) a handle assembly including a handle and a pin extending through said body member radial opening and engaged to said sleeve, rotation of said handle moving said pin axially and said sleeve axially;

(i) a stem assembly slideably positioned within said sleeve, said stem assembly having
  (i) a stem with a first end engageable with said poppet valve and a second end engageable with said male member poppet valve,
  (ii) a valve surface sealingly engaging said sleeve when in a first position and spaced therefrom when in a second position, and
  (iii) a second spring positioned between said stem assembly and said sleeve urging said stem assembly toward said first position.

12. A fluid coupling according to claim 11 further including a third spring positioned between said adapter and said stem assembly urging said stem assembly away from said adapter toward said valve surface second position.

* * * * *